Patented Feb. 19, 1935

1,991,647

UNITED STATES PATENT OFFICE 1,991,647

PIGMENT AND PROCESS OF PREPARING THE SAME

William A. Adamson, South Milwaukee, Wis., assignor to E. I. du Pont de Nemours & Company, Wilmington, Del., a corporation of Delaware No Drawing. Application August 22, 1932, Serial No. 629,881

13 Claims. (Cl. 260—59)

This invention relates to pigments and a process for the manufacture thereof. It especially contemplates the production of anthraquinone compounds or other vat color compounds or mixtures thereof in a state of fine subdivision.

As is well known, the form in which a coloring material occurs greatly affects its usefulness in certain processes and particularly its adaptability to the production of pigments. Thus dyes and similar materials which are employed as pigments are of little value for this purpose unless they exist in the proper state of subdivision.

It is also known that dyes, as produced commercially, are generally characterized by a coarse agglomerated nature which renders them difficult to grind into the finely divided state required for the preparation of pigments. In order to produce suitable pigment dyes a number of methods have been proposed and described in the patents and literature. For example, according to U. S. Patent 1,150,863 to Just et al., vat dyes of the anthracene series can be converted into a form suitable for use as pigments by the constant agitation of a thick paste of a separated alkali metal leuco salt of the dye in alkali and water. Pigments of this series may also be formed by the acidification of the respective vats, separating the dyestuff in its leuco form and finally subjecting the isolated leuco body to oxidation, as described in German Patent 294,830. A further method of producing dyes of this series is described in German Patent 313,724 and U. S. Patent 1,145,934, whereby vat dyes of the indanthrone series are obtained in finely divided form by stirring such dyes in the cold in a limited amount of highly concentrated sulfuric acid and dissociating the sulfate thus formed with icewater.

The products obtained through the application of the various processes above described are more or less finely divided as they occur in aqueous paste form but when such pastes are dried they cake together into a hard solid mass which does not lend itself readily to grinding with oil or with dry fillers.

It is an object of the present invention to produce color materials in a fine state of subdivision and in different form from that which has heretofore been possible. It is a further object to produce anthraquinone pigments and other vat color compounds which are soft-grinding, that is to say, which may easily be ground into a fine state of subdivision. A still further object is the provision of a new and improved process for producing pigments of the character above described.

Further objects of the invention are to increase the brilliance of color material when combined or mixed with a substratum or when ground with oil or other vehicle, or with a dry filler, and to produce improved color printing pulp and improved color material for inks, paints and lacquers. Other and further important objects of this invention will appear as the description proceeds.

According to my invention, these objects are accomplished by introducing a sulfuric acid solution of the selected color material, preferably in the form of a fine stream, into an alkaline carbonate or bicarbonate solution whereby a solid product is precipitated and may be recovered in any suitable manner. In the reaction the carbonate or bicarbonate, for example, sodium carbonate or sodium bicarbonate, in aqueous solution, reacts violently with the sulfuric acid, liberating much heat and at the same time setting free the finely divided color material in a constantly forming atmosphere of carbon dioxide. The liberated energy and the mechanical action of the gas bubbles appear to effect a disruption of any solid agglomerates that might tend to form.

In any event, I have observed that pigments which have undergone this treatment do not cake upon evaporation of their aqueous suspensions, and acquire the highly desirable property of soft grinding. This effect may be further increased by adding a dispersing agent, such as dibutyl-naphthalene-sulfonic acid, to the suspended aqueous mass before evaporation.

Where it is desired to incorporate a substratum into the final pigment, this may be added to the carbonate solution either before the precipitation of the color material or afterwards, but prior to evaporation. Good results are, however, obtained also by dry grinding of the color material, after final evaporation, with the substratum. In this case the substratum is more correctly designated as a filler. But the possibility of incorporating it at this stage demonstrates and is due to the soft-grinding qualities acquired by the color material.

While the invention is susceptible of considerable variation and modification in the manner of its practical application, particularly as regards the nature of the compounds treated, temperatures, proportions of materials and exact method of procedure, the following examples will illustrate how the invention may be practiced. The proportions are given in parts by weight.

Example 1

200 parts of sulfuric acid monohydrate are added to 3 parts of water, and 20 parts of indanthrone powder are added at 30–50° C. The charge is agitated at 50° C. for one hour or until the dyestuff has dissolved. In a separate container, 230 parts of soda ash are dissolved in 6000 parts of water at 90° C. The sulfuric acid solution of indanthrone is introduced as a fine stream into the sodium carbonate solution, under vigorous agitation, while the temperature is maintained at 90–96° C., and the charge is kept alkaline to brilliant yellow paper by adding more soda ash if necessary.

When the acid-dye solution has all been added the charge is brought to the neutral point by adding more sulfuric acid, heated for fifteen minutes at 90–95° C., filtered with suction and washed with hot water to remove soluble inorganic salts. The filter cake is dried at 100° C. whereby a product is obtained which possesses soft-grinding properties not obtainable by previous processes.

Example 2

25 parts of 1-benzoylamino-4-hydroxy-anthraquinone crystals are dissolved in 250 parts of 93% sulfuric acid at a temperature below 10° C. 27 parts of water are dropped slowly into the acid solution of the dye at such a rate that the temperature of the acid solution does not exceed 10° C. In a separate container, 270 parts of sodium carbonate are dissolved in 8000 parts ice and water, and the acid solution is run into this cold sodium carbonate solution under good agitation and in such a manner that the temperature does not exceed 10° C. By this treatment the dye is thrown out of solution in yellowish to reddish flocks. The suspension is made slightly acid with hydrochloric acid and agitated cold for four or five hours, filtered and washed acid free, and the cake dried and easily ground to a fine state of subdivision. The resultant product is characterized by excellent pigment qualities. It may be mixed with fillers, such as lithopone, and ground to give a pigment of high brilliance and great tinctorial strength.

Example 3

25 parts of 1-benzoylamino-4-hydroxy-anthraquinone are treated as in Example 2, except that the washed filter cake is not dried directly. Instead, it is first made into a thin aqueous suspension with 3000 parts water. 0.5 parts of dibutyl-naphthalene-sulfonic acid powder and 25 parts of chloramine T are added and the suspension gradually heated to 80° C. The temperature is maintained at 80° C. until no further color change in the suspended dye is perceptible. The solid product is filtered off, washed with hot water and dried at 100° C. to yield a soft-grinding color material.

Example 4

25 parts of indanthrone powder are added to 250 parts sulfuric acid monohydrate at 25–30° C. over a period of one hour. The temperature is then raised to 50° C. and this temperature is maintained until the dye is completely dissolved. In a separate container, 410 parts of sodium bicarbonate are dissolved in 5000 parts of water at 70–80° C. The acid solution of the dyestuff is then run slowly into the sodium bicarbonate solution at a temperature of 70–80° C. The dyestuff is thrown out of solution in bright blue flocks. This suspension is then acidified with hydrochloric acid, filtered hot and washed acid free. The solid product, after being dried, may be ground with ease to a state of fine subdivision.

As previously indicated, the invention is not limited by the examples set forth above. Especially desirable results have been obtained with dyestuffs other than those described, and more particularly:

1,5-dibenzoyldiamino-anthraquinone
Chlorinated isoviolanthrone
Diethyl-dipyrazol-dianthrone
4,5'-dibenzoyldiamino-1,1'-dianthraquinonyl-carbazole.

Good results have also been obtained by the treatment of non-dyeing color materials of the anthraquinone series, such as, for example, 1-amino-2-methyl-anthraquinone, diamino-anthrarufin, 1,8-dibenzoyl-diamino-anthraquinone, and anthraquinone-2,1-acridone.

In general, it will be understood that my invention may be applied to any color substance which is soluble in sulfuric acid without decomposition, and which is capable of being precipitated from such solution by means of alkaline carbonate.

As for the latter, it may vary in kind and proportion within wide limits. A good rule to follow is to use such carbonates whose metallic ion does not give with sulfuric acid an insoluble sulfate, which might contaminate the pigment. Sodium, potassium, or ammonium carbonates and bicarbonates are excellently adapted for the purpose of this invention.

For best results, the precipitation should be carried out at such a rate or in such a manner that the precipitation mass should not cease to be alkaline. The object of this is to prevent the acid from hydrolyzing or otherwise decomposing the dyestuff material under the influence of the heat of neutralization. But wide latitude is permissible in this respect, as will be readily understood to those skilled in the art.

As already indicated, dispersing or wetting agents may be added to the precipitation mass either before or after precipitation of the pigment. These assist in retaining the soft-grinding qualities of the pigment during the evaporation step and are especially desirable where substrata or fillers are mixed with the pigment. In a similar manner, mild oxidizing agents may be added to the precipitated mass to oxidize such impurities as it may contain.

Many other variations and modifications are possible within the scope of this invention, as will be readily understood to those skilled in the art.

In the claims below it should be understood that by the term "an alkaline carbonate" I intend to cover and include the normal carbonates and bicarbonates of sodium, potassium and ammonium. Also, where color pigments are claimed as articles of manufacture, I mean to cover and include the same not only in substance, but also in whatever state they exist when applied to material printed, painted or pigmented therewith.

I claim:

1. The process of preparing a dry color material having soft-grinding properties, which comprises dissolving a water-insoluble organic coloring material in sulfuric acid and reprecipitating it by pouring the mass into an aqueous alkaline carbonate solution.

2. The process of producing a soft-grinding color material which comprises introducing a sulfuric acid solution of a water-insoluble organic color material in the form of a fine stream into an alkaline aqueous solution of a carbonate or bicarbonate having a sulfate which is soluble in the solution.

3. The process of producing soft-grinding color material which comprises introducing a sulfuric acid solution of a vat color material into an alkaline aqueous solution of a carbonate or bicarbonate having a sulfate which is soluble in the solution, and recovering the precipitated color material.

4. The process of producing soft-grinding color material which comprises introducing a sulfuric acid solution of an anthraquinone compound into an alkaline aqueous solution of a carbonate or bicarbonate having a sulfate which is soluble in the solution, and recovering the precipitated color material.

5. The process of producing soft-grinding pigment which comprises introducing a sulfuric acid solution of a vat color material into an aqueous solution of an alkaline carbonate having a sulfate which is soluble in the solution, and incorporating with the solid product a substratum material.

6. The process of producing a soft-grinding pigment compound which comprises introducing a sulfuric acid solution of a vat color material into an alkaline aqueous solution of a carbonate or bicarbonate, whereby the color material is precipitated in a state of fine subdivision, adding a dispersing agent, and evaporating the mixture to dryness.

7. The process of producing a soft-grinding color material which comprises introducing a sulfuric acid solution of a color material into an aqueous solution of an alkali-metal carbonate or bicarbonate.

8. The process of producing 1-benzoylamino-4-hydroxy-anthraquinone in a state characterized by the quality of soft-grinding which comprises introducing a sulfuric acid solution of 1-benzoylamino-4-hydroxy-anthraquinone into an aqueous solution of an alkali-metal carbonate or bicarbonate.

9. The process of producing soft-grinding 1-benzoylamino-4-hydroxy-anthraquinone which comprises introducing a sulfuric acid solution of 1-benzoylamino-4-hydroxy-anthraquinone into an aqueous solution of an alkali-metal carbonate or bicarbonate while maintaining a relatively low temperature.

10. The process of producing soft-grinding 1-benzoylamino-4-hydroxy-anthraquinone which comprises introducing a sulfuric acid solution of 1-benzoylamino-4-hydroxy-anthraquinone into an aqueous solution of an alkali-metal carbonate or bicarbonate while maintaining a relatively low temperature, making the product slightly acid, and recovering the solid material.

11. The process of producing soft-grinding 1-benzoylamino-4-hydroxy-anthraquinone which comprises introducing a sulfuric acid solution of 1-benzoylamino-4-hydroxy-anthraquinone, in the form of a stream and with agitation, into an aqueous solution of an alkali-metal carbonate or bicarbonate, while maintaining the mixture on the alkaline side and at a relatively low temperature, making the product slightly acid, filtering and treating the solid material with a dispersing agent and an oxidizing agent.

12. A dry water-insoluble color pigment of the anthraquinone series characterized by great brilliance, high tinctorial strength, and soft grinding properties, said pigment being substantially identical with the product obtainable according to a process as defined in claim 1.

13. A vat water-soluble color pigment of the anthraquinone series characterized by great brilliance, high tinctorial strength, and soft grinding properties, said pigment being substantially identical with the product obtainable according to a process as defined in claim 3.

WILLIAM A. ADAMSON.

CERTIFICATE OF CORRECTION.

Patent No. 1,991,647. February 19, 1935.

WILLIAM A. ADAMSON.

It is hereby certified that error appears in the printed specification of the above numbered patent requiring correction as follows: Page 3, second column, line 36, claim 13, for "water-soluble" read water-insoluble; and that the said Letters Patent should be read with this correction therein that the same may conform to the record of the case in the Patent Office.

Signed and sealed this 26th day of March, A. D. 1935.

(Seal)

Leslie Frazer
Acting Commissioner of Patents.